No. 645,277. Patented Mar. 13, 1900.
C. B. TOURVILLE.
PERCOLATOR FOR COFFEE OR TEA POTS.
(Application filed Dec. 9, 1899.)
(No Model.)
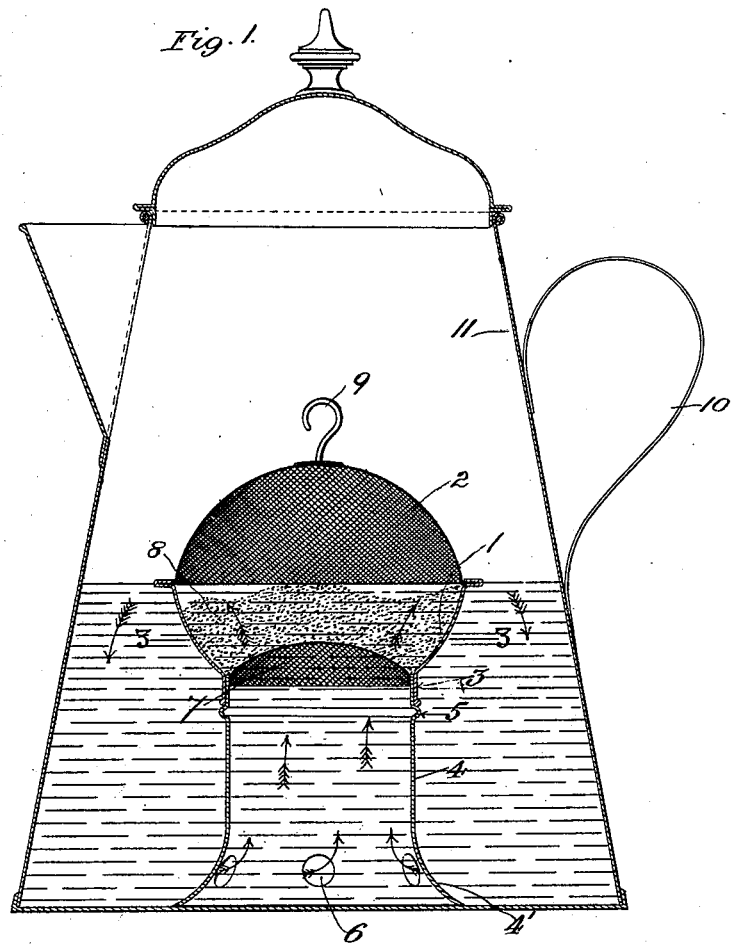
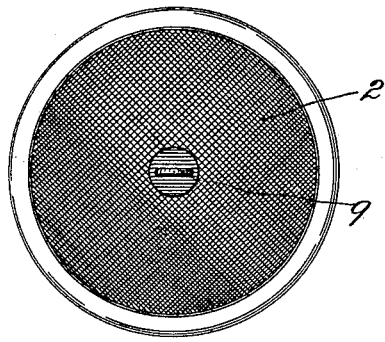
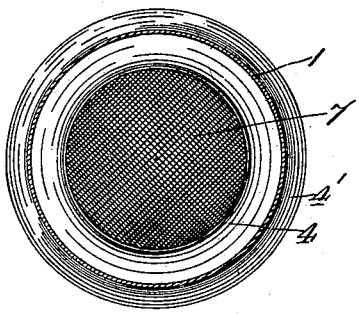
WITNESSES
Edward W. Currell
G. L. Belfry
INVENTOR,
Charles B. Tourville
by Emil V. Staren, atty

UNITED STATES PATENT OFFICE.

CHARLES B. TOURVILLE, OF ST. LOUIS, MISSOURI, ASSIGNOR OF ONE-HALF TO ELLEN M. OSBORN, OF SAME PLACE.

PERCOLATOR FOR COFFEE OR TEA POTS.

SPECIFICATION forming part of Letters Patent No. 645,277, dated March 13, 1900.

Application filed December 9, 1899. Serial No. 739,790. (No model.)

*To all whom it may concern:*

Be it known that I, CHARLES B. TOURVILLE, a citizen of the United States, residing at St. Louis, State of Missouri, have invented certain new and useful Improvements in Percolators for Coffee or Tea Pots, of which the following is a full, clear, and exact description, reference being had to the accompanying drawings, forming a part hereof.

My invention has relation to improvements in percolators for coffee and tea pots; and it consists in the novel arrangement and combination of parts more fully set forth in the specification and pointed out in the claim.

In the drawings, Figure 1 is a middle vertical section of a coffee-pot and percolator submerged within the water contained therein, showing the manner of applying my invention. Fig. 2 is a top plan view of the percolator, and Fig. 3 is a horizontal section on line 3 3 of Fig. 1.

The object of my present invention is to construct a coffee or tea receptacle through which the water of the pot can circulate freely during the ebullition of the same, thereby extracting the flavor from the coffee or tea contained in the cage and yet preventing any coffee-grounds or tea-leaves from gaining access to the liquid to be served.

In detail the device may be described as follows:

Referring to the drawings, 1 represents a funnel-shaped coffee or tea receptacle closed at the top by a wire or reticulated hood 2, the upper edge of the receptacle being seamed over the edge of the wire, as clearly shown in Fig. 1. The base of the receptacle terminates in a circular neck 3, which snugly receives the upper end of a supporting-tube 4, the base of the neck resting against a bead 5, stamped in the walls of the tube. The latter has an outwardly-flaring base 4', provided with openings 6. The upper end of the tube is closed by a wire or reticulated screen 7, which when the parts are assembled serves to support the coffee or tea 8 confined in the receptacle. The hood 2 is provided with a hook 9, by which the device may be suspended to the handle 10 of the pot 11 when not in use.

The tube 4 induces a circulation of the water when the latter is boiling, substantially as indicated by the arrows in Fig. 1, the currents of water passing up through the tube and into the coffee or tea, thereby extracting all the strength and flavor, but preventing the grounds or tea-leaves from mixing with the liquor to be served. The result is a very clear beverage, be the same coffee or tea. When the two sections of the device are taken apart, the coffee or tea is dumped out from the receptacle and the parts thoroughly cleaned.

It is apparent that the device may be altered in detail without departing from the spirit of my invention.

The object of having the walls of the receptacle tapering or funnel-shaped is to cause the coffee or tea to gather at the center, thereby permitting all parts thereof to come in contact with the ascending current of water.

Having described my invention, what I claim is—

A percolator attachment for coffee and tea pots, comprising a receptacle having inclined walls, a wire hood for the same, a hook carried by the outer face of the hood, a circular neck at the base of the receptacle, a tube adapted to be coupled to said neck and having formed thereon a bead for the support of the lower edge of the neck, a wire screen at the adjacent end of the tube forming a support for the ground coffee or tea-leaves, and a flaring base for the tube, the base having a series of openings formed therein for the free circulation of the water, substantially as set forth.

In testimony whereof I affix my signature in presence of two witnesses.

CHARLES B. TOURVILLE.

Witnesses:
EMIL STAREK,
GEO. L. BELFRY.